United States Patent
Klein et al.

[19]

[11] Patent Number: 5,826,899

[45] Date of Patent: Oct. 27, 1998

[54] HIGH PERFORMANCE SUSPENSION BICYCLE FRAMESET

[75] Inventors: Gary D. Klein; Darrell W. Voss, both of Chehalis, Wash.

[73] Assignee: Klein Bicycle Corporation, Chehalis, Wash.

[21] Appl. No.: 675,089

[22] Filed: Jul. 3, 1996

[51] Int. Cl.$^6$ .................................................... B62K 1/00
[52] U.S. Cl. .......................................... 280/284; 280/288
[58] Field of Search .............................. 280/281.1, 284, 280/288, 274

[56] References Cited

U.S. PATENT DOCUMENTS 5,193,834  3/1993  Strozyk .................................. 280/284
5,370,411  12/1994  Takamiya ................................ 280/284
5,409,249  4/1995  Busby ..................................... 280/284
5,474,318  12/1995  Castellano .............................. 280/284

*Primary Examiner*—Robert Oberleitner
*Assistant Examiner*—C. T. Bartz
*Attorney, Agent, or Firm*—Jim Zegeer, Esq.

[57] ABSTRACT

A bicycle frameset having a front frame portion and a rear triangle swing arm portion, a head tube mounted don the forward end and a seat tube mounted on the trailing end. The rear triangle swing arm incorporates a rigid channel member having a pair of reinforced legs joined by an integral base piece. The lower end of the channel has a shaped edge which is shaped complementary to the shape of the external surface of the bottom bracket. The swing arm bearing and pivot connection to the front frame portion utilizes a clevis-like member bridging the upper ends of the legs of the rigid channel member.

11 Claims, 7 Drawing Sheets

Figure 3C
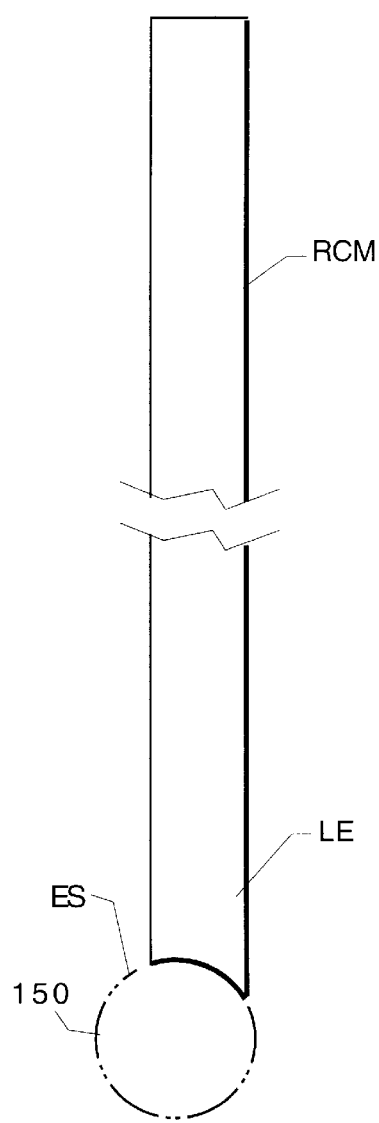
Figure 4A
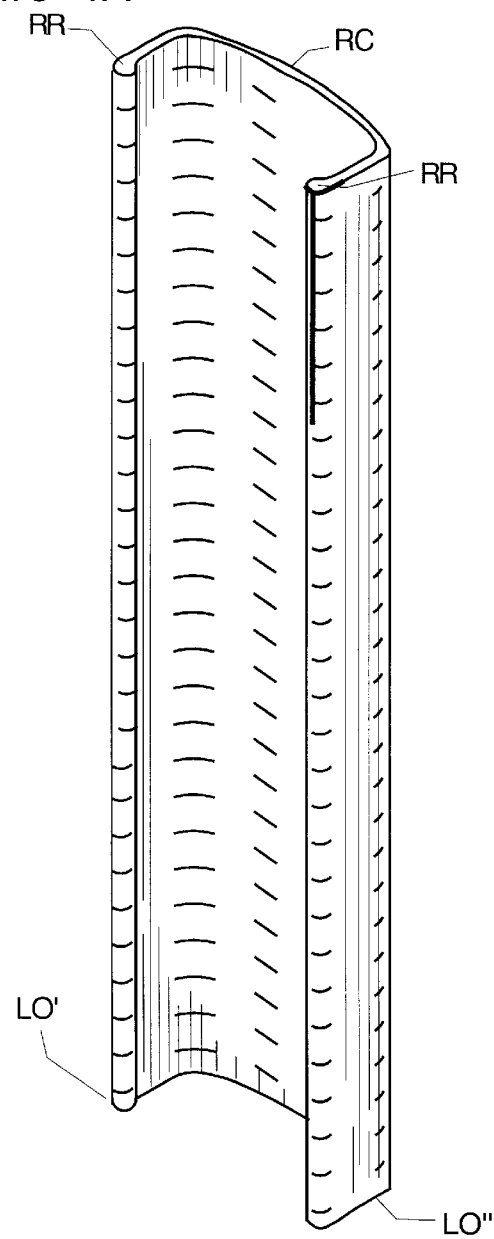
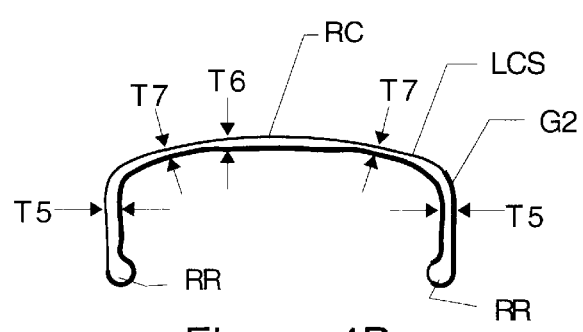
Figure 4B

Figure 5A
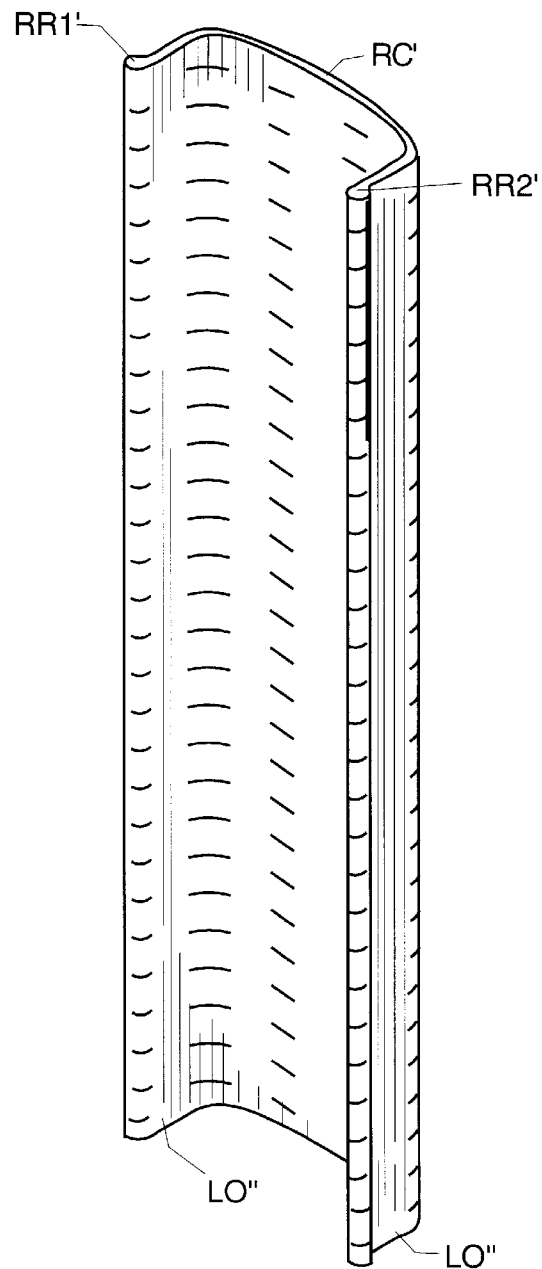
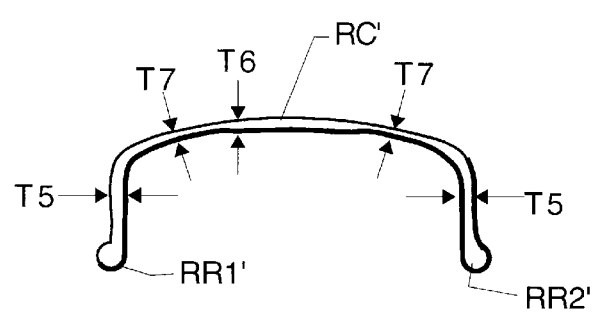
Figure 5B

HIGH PERFORMANCE SUSPENSION BICYCLE FRAMESET

The present invention is directed to improved bicycle framesets, and more particularly to a channel structure for high performance suspension bicycle framesets.

Light-weight high-performance suspension bicycles which have high degree of stiffness, strength and low maintenance characteristics are disclosed in pending patent application Ser. No. 08/519,160 filed Aug. 25, 1995 by Gary Klein and Darrell Voss and entitled HIGH EFFICIENCY BICYCLE FRAME SUSPENSION, which is assigned to the assignee of the present invention.

The object of the present invention is to provide an improved frameset which incorporates uniquely shaped channel sections which lower the cost, both in raw material and labor operations by reducing the amount of welding and parts association needed to assemble the structure.

FIGS. 1A and 1B disclose high performance bicycle suspension framesets in which a unified rear triangle includes a pair of tube members extending downwardly from each side of the main pivot to the bottom bracket.

According to the present invention, in one preferred embodiment, a special extruded lightweight metal channel section is used to transmit load to the bottom bracket of the rear triangle swing arm portion or unified triangle of the bicycle. Several configurations of the rigid channel are disclosed. The less expensive is a solid channel with beefy sides (about 0.090 inch wall thickness) to provide high strength and rigidity to the pivot and the bottom bracket shell assembly. This is a substantially thicker wall than would typically be used in tubing in this part of a bicycle frame. These walls provide maximum support directly to the bottom bracket bearings and to the highly stressed part of the suspension pivot. The reinforced side wall sections are also directly in line with the major load paths between the swing arm pivot and the bottom bracket. In this embodiment, a reinforcing rib, preferably rounded, at each edge of the channel is used to further stiffen the section and keep the side walls from flexing in or out and also to facilitate welding. The thicker edge does not burn away when the torch hits it as a constant section does. The bottom of the channel is of relatively light gauge (about 0.040 to 0.050 inch) which is predominately in shear, and the center of the channel bottom includes a reinforced section (about 0.060 to 0.070 inch thick) to increase denting resistance, for example, when the bike is high centered on a log, and to reinforce the water bottle mounts in this area.

In a second embodiment, the extruded channel section is channel shaped but with an approximately triangular hollow on each side. This configuration achieves similar functions as the solid channel discussed above, but with increased torsional stability due to the twin hollow triangular sections. In this embodiment, The twin hollow triangular sections act as torque tubes. Also, in this second embodiment, because of the extra material in the tubular structure and the extra stiffness resulting therefrom, the wall thickness can be reduced in the side wall to about 0.075 inch and the rounded reinforcing rib is not needed. The double hollow extrusion is a still much less expensive method of production than a manipulated tube or forged structure performing the same function.

In each case, extruded channel sections are lower in cost than a shaped tubular structure, both in raw material cost, number of operations or labor, and by reducing the amount of welding needed to assemble the structure. As noted, above, in a typically tubular structure, it needs to be welded all the way around, and the channel needs to be welded only on the outside.

Moreover, the channel is lightweight. By selectively placing material where the high loading is, it is lighter than an equivalent strength plain wall tubular structure. It is very different than a folded plate structure such as disclosed in the Riva U.S. Pat. No. 2,756,071 which must contain excessive material in many areas in order to achieve sufficient material where the stress is concentrated.

The channel is a highly efficient shape for fitting both the bottom bracket shell (where the pedal/crank bearings are located) and the upper pivot bearings. Moreover, the channel also allows clearance for the front derailleur to mounted on the derailleur tube. In a traditional tubular structure, this can interfere with the traditional clamp-style front derailleur mountings at the joint between the connecting tube and the front derailleur tube. The rigid channel of the present invention provides much greater clearance in this area which is particularly needed in cases of newer derailleurs. The channel is ideal for unified rear triangle bicycles as shown in the drawings, but it is not limited to the unified rear triangle type design. It is also capable of solving similar problems with types of frames where the bottom bracket is attached to the front portion of the bicycle. The channel disclosed herein can be utilized to advantage to bridge the space between the bottom bracket shell and the suspension pivot assembly, especially where derailleur interference would result from using a normal tubular structure. The twin hollow design in the second embodiment gives higher swing arm stiffness than the solid section for approximately the same weight. However, both embodiments disclosed herein are very good. The shaped extruded channel is a highly unique and novel way of getting the reinforced material where needed without a big cost or weight penalty. The extrusion is much less expensive than a manipulated seamless tube or a complex forging.

Finally, the shaped channel section has a bold, clean attractive appearance. While the extrusion is particularly applicable to welded aluminum bikes, it can be applied to other bikes such as magnesium, titanium and other lightweight metal alloys. In a composite frameset, the channel shape could be refined so that the edge ribs are on the outside of the channel so that the mold or core will be easy to release. It is relatively easy to mold a composite part that does not have hollow cores, and this would be an attractive shape for composite suspension frame fabrication where similar problems are found.

BRIEF DESCRIPTION OF THE DRAWINGS

The above and other objects, advantages and features of the invention will become more apparent when considered with the following specification and accompanying drawings wherein:

FIG. 3C shows the channel fitted on the bottom bracket, FIG. 4A is a perspective view of a rigid channel member according to a second preferred embodiment of the invention; FIG. 4B is a sectional view of the rigid channel member shown in FIG. 4A; and FIG. 5A is a perspective view of a composite material embodiment of the rigid channel member; and FIG. 5B is a sectional view of a composite channel section incorporating the invention.

DETAILED DESCRIPTION OF THE INVENTION

Figure 1A:
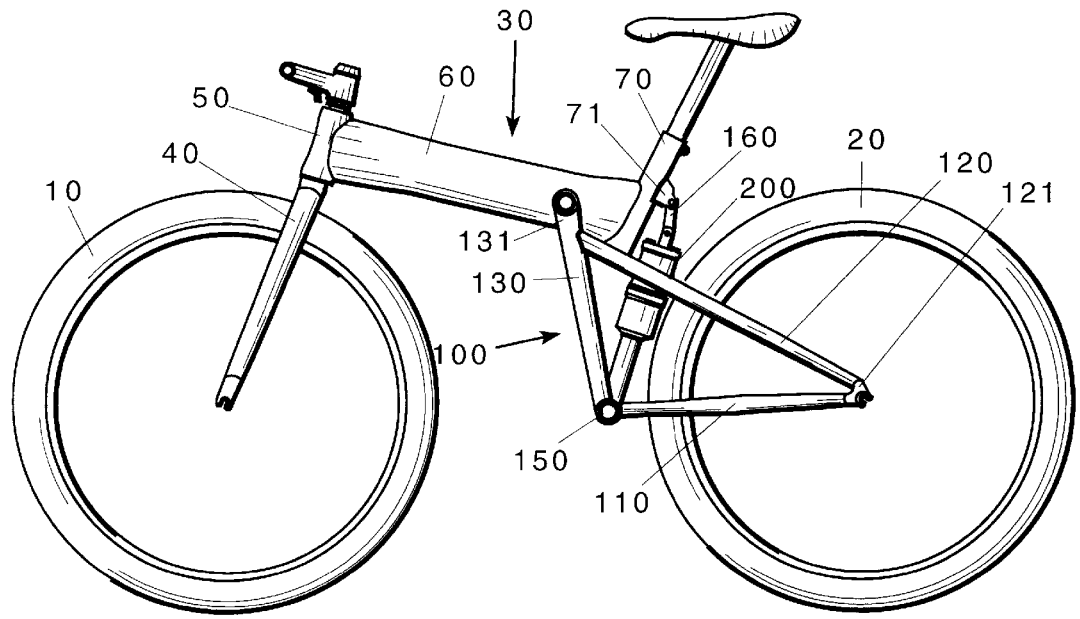
FIG. 1A is a side elevational view of a suspension bicycle frameset as disclosed in the aforementioned application.
Figure 1B:
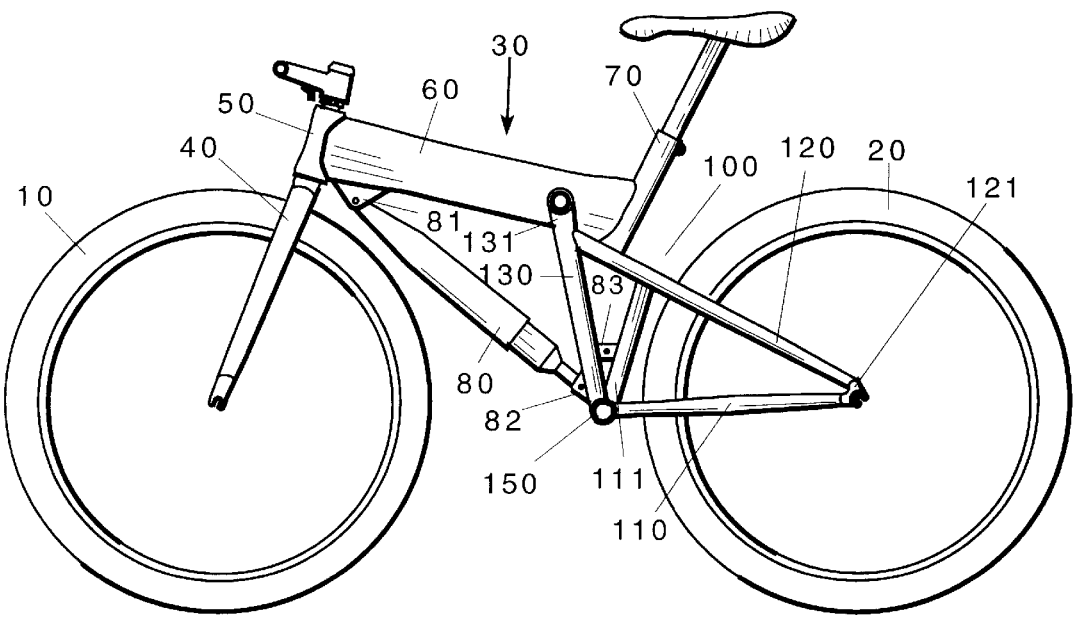
FIG. 1B is a side elevational view of a second embodiment of a bicycle frameset as disclosed in the aforementioned patent application.
Figure 1C:
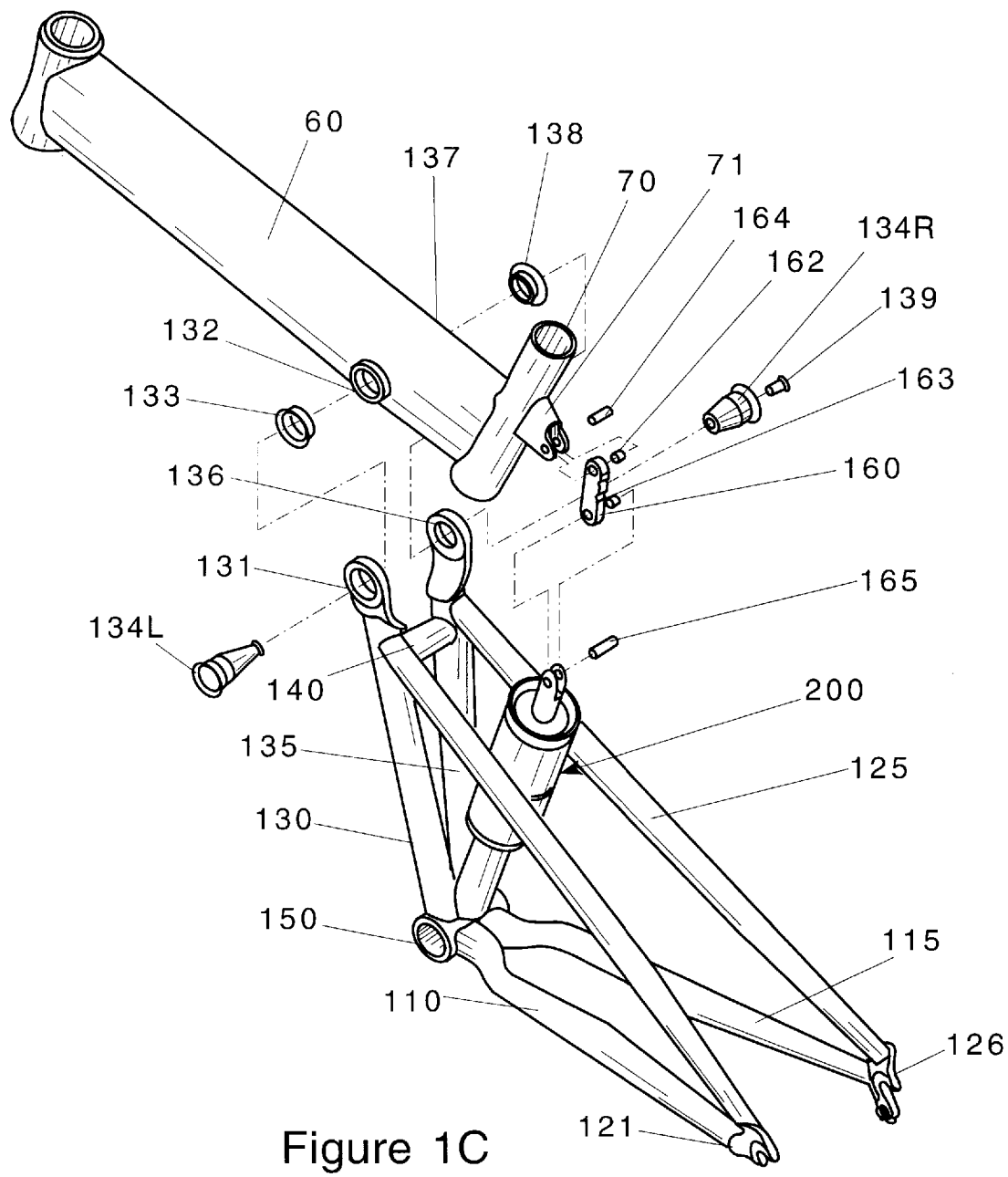
FIG. 1C is an exploded isometric view of the rear triangle and pivotal connection to the main tube.
Figure 2A:
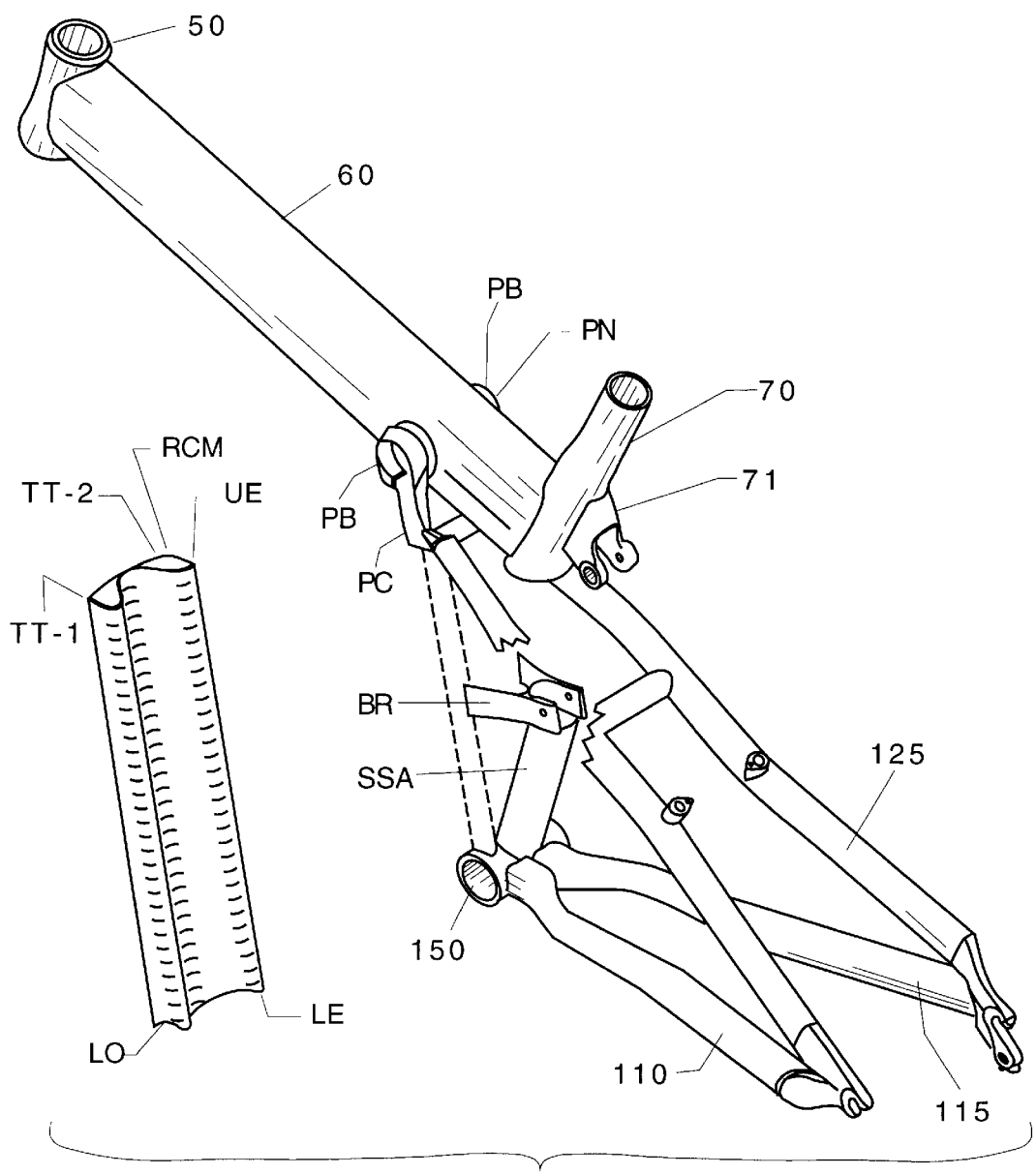
FIG. 2A is an isometric perspective view of a suspension bicycle frameset incorporating the invention.
Figure 2B:
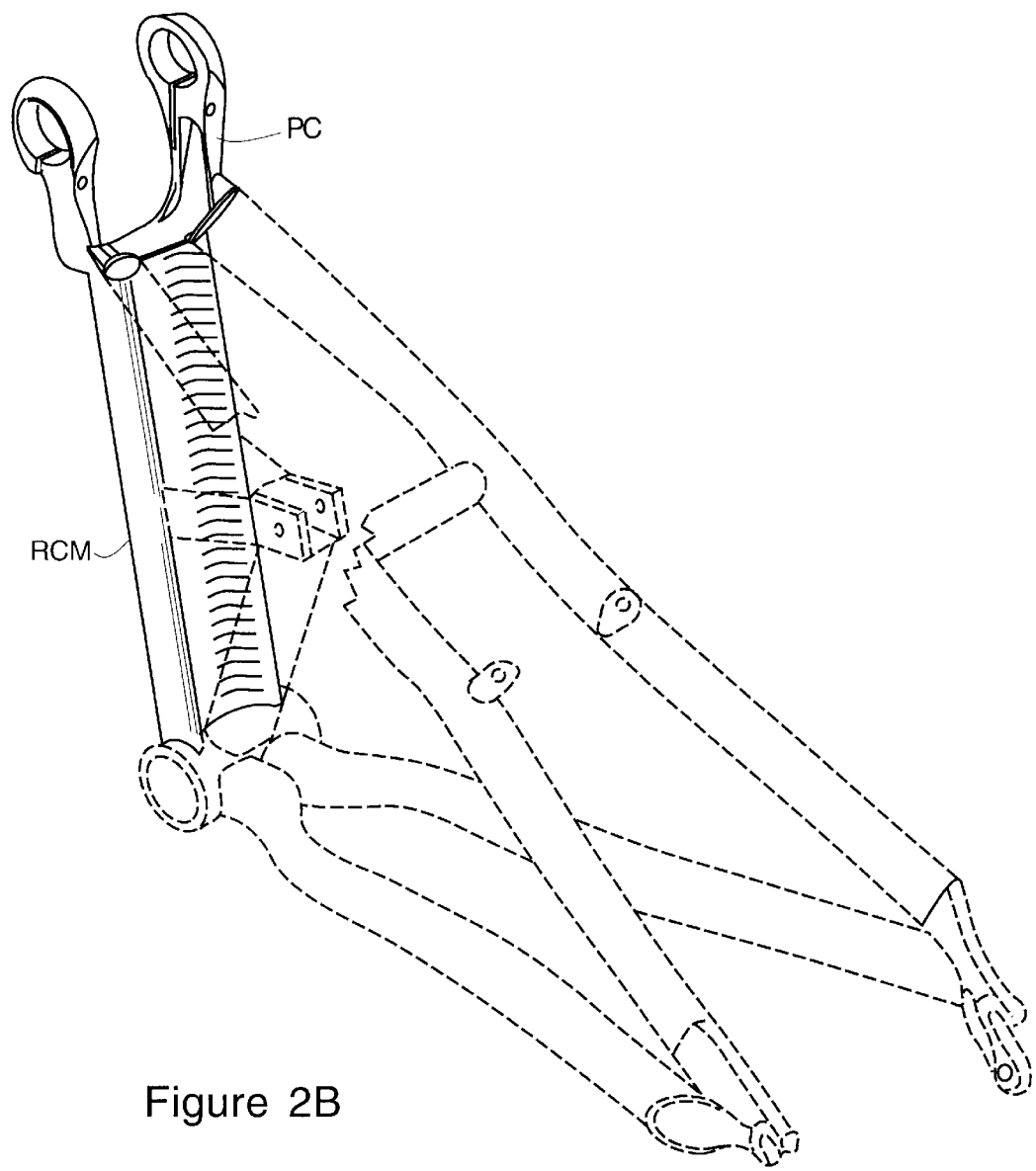
FIG. 2B is a perspective view of the channel/pivot clevis structure incorporating the invention.

Referring to the suspension bicycle structure shown in FIGS. 1A and 1B, the front wheel 10 and the rear wheel 20 are joined by frame 30 and a front fork 40. The fork 40 includes a steerer tube which pivots in headset bearings in head tube 50 and a handlebar assembly steers the bicycle. Main tube 60 connects head tube 50 to a seat retention tube 70. Rear triangle assembly 100 is a unified rigid assembly comprised of a left chainstay 110, right chainstay 115, left seatstay tube 120, left rear dropout 121, right seatstay tube 125 with right rear dropout 126. Left pivot strut 130 has a left pivot fitting 131 and right pivot strut 135 has its right pivot fitting 136. Tubes 130 and 135 join the end pivot fittings 131, 136 to the bottom bracket 150. A spring shock absorber assembly 200 connects the bottom bracket via linkage 160 to the seat tube 70. Chainstays 110 and 115 and front derailleur tubes spring assembly 200 and pivot struts 130 and 135 are all joined by welding to bottom bracket 150. A similar construction is utilized in connection with FIG. 1B, but instead of spring assembly 200 being between the seat tube 70 and bottom bracket 150, a spring shock absorber 80 is between the bottom bracket 150 and a connection point 81 on the forward end of main tube 60.

As used herein, "unified rear triangle" means that the bottom bracket and rear dropouts are structurally solid, or not moving relative to each other, and pivot or move as a unit for suspension purposes. The seat and steering apparatus are not included in this part.

THE PRESENT INVENTION

The present invention replaces tubes 130 and 135 on the rear triangle swing arm portion with a single rigid channel member RCM having a pair of spaced channel legs joined by an integral base. The rigid channel member has a lower edge which is shaped complementary to the shape of the external surface portion ES of the bottom bracket, and the upper end of the rigid channel member includes a pivot clevis PC for coupling to the main pivot PN of the suspension assembly. The welding of the pivot clevis base PCB to the upper end UE of the rigid channel member further rigidifies the channel member RCM.

Referring to the embodiment shown in FIGS. 2 and 3A–3C, the rigid channel member RCM has an upper end UE which has a pivot clevis PC welded or otherwise secured to the upper end UE and a pair of spaced pivot bearings PB for securement to the pivotal coupling to the main pivot PN on main tube 60'. The lower end LE of rigid channel member RCM has its lower edges LD shaped complementary to the shape of the external surfaces ES of the bottom bracket portion 150'. The shaped lower edge LD is then fitted in congruence with the shaped external surface portion ES of the bottom bracket 150' so that it fits uniformly and a good weld joint can be made. In the embodiment shown, the rigid channel member RCM shown has a pair of torque tubes TT1 and TT2 integrally formed as the legs of the channel member RCM.

A brace BR is welded intermediate the ends of channel member RCM and fastened to suspension shock absorber tube SSA.

Figure 3A:
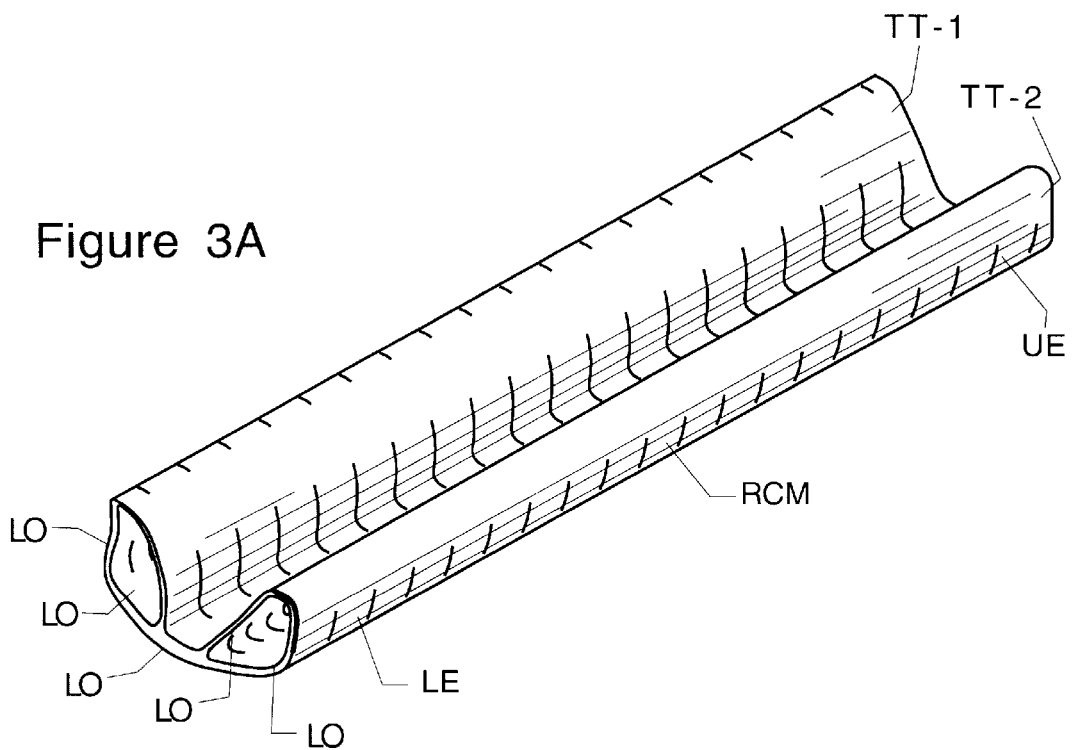
FIG. 3A is a perspective view of the channel structure for connecting the suspension pivotal assembly to the bottom bracket of the rear swing arm portion of the bicycle frameset shown in FIG. 2A.
Figure 3B:
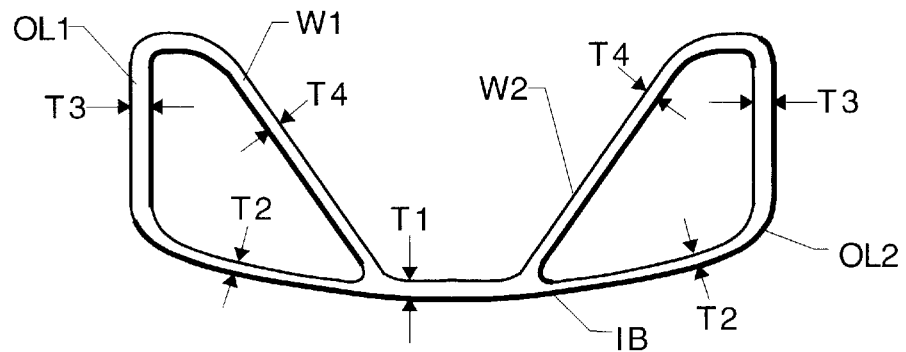
FIG. 3B is a sectional view of the channel shown in FIG. 3A

Referring now to FIGS. 3A–3C which show this embodiment of the rigid channel member RCM in greater detail, note in FIG. 3C the shaping of the lower end LE of the rigid channel member RCM to be in close conformance and congruency with the shaped external surface ES shaping of lower edge LO of the lower end LE of the rigid channel member RCM to be in congruency with the shape of the external surface ES of bottom bracket 150'. In this embodiment, since the rigid channel member RCM is an extrusion (which may be of aluminum alloy or other lightweight metal extrusion) it can be welded to the bottom bracket 150'.

A sectional view is shown in FIG. 3B of the rigid channel member having the torque tubes therein. Note that the central section or integral base IB of the channel member is thicker T1 (about 0.070") in the middle than at the lateral edges T2 (about 0.045"), respectively. In this embodiment, the outer legs OL1 and OL2 of the channel member have thickness T3 (about 0.075") which is slightly greater than the thickness of T1 and significantly greater than the thickness of T2. Moreover, the thickness of T4 (about 0.045") of the diagonal members W1 and W2 which constitute part of the torque tubes TT1 and TT2, respectively, is approximately the same as the thickness of T2. Thus, the sides OL1 and OL2 are rather beefy, and form part of torque tubes TT1 and TT2 to provide high strength and rigidity in the frame member transferring load between the pivot and bottom bracket assembly. This is a substantially thicker wall than would be used in conventional tubing in this part of the bicycle frame. These provide maximum support directly adjacent to the bottom bracket bearing and to the highly stressed part of the suspension pivot. Thus, this extruded channel section has a hollow triangular tube on each side which function as torque tubes. This achieves similar clearance functions as the solid channel member of FIGS. 4A and 4B but with increased torsional stability due to the twin hollow triangular sections or torque tubes TT1 and TT2. This double hollow extrusion is much less expensive method of production than a manipulated tube or forged tube structure performing the same functions. Moreover, the extruded channel is lower in cost than a shaped tubular structure, both in raw material costs, number of operations or labor and by reducing the amount of welding needed to assemble the structure. Typically, a tubular structure needs to be welded all the way around, and the channel needs to be welded only on the outside. However, note that this does not preclude welding on the inside if this is desired. Moreover, the channel is lightweight. By selectively placing material only where the high loading is, it is lighter than an equivalent strength plane wall tubular structure. It is very different from a folded plate structure of the type shown in the Riva patent discussed above.

In addition, the channel configuration is a highly efficient shape for both the edges at the bottom bracket shell and the upper pivot bearings. The clevis structure described above, can be shaped extensions of the side legs OL1 and OL2.

The channels also allow clearance for the front derailleurs to be mounted on the derailleur tube. As is well known, a traditional tubular structure can interfere with the traditional clamp style front derailleur mount at the joint between the connecting tube and the front derailleur tube. The channel also provides much greater clearance in this area. This is especially true of the new top swing front derailleurs from Shimano and it applies particularly to the high pivot style of unified rear triangle disclosed in FIGS. 1A and 1B.

In the embodiment shown in FIGS. 4A and 4B, an extruded metal channel member has its lower edges LO' configured to be congruent to the surface configuration of the external surface ES of the bottom bracket 150' and, in this embodiment, the channel legs L1 and L2 are relatively thicker (T5 about 0.090 inch) to provide high strength, rigidity, and support between the main pivot and the bottom bracket shell 150'. This is substantially thicker than the tubing would be used in this part of the bike frame and provides maximum support directly adjacent to the bottom bracket bearings and to the highly stressed part of the suspension pivot. As in the case of the embodiment shown in FIGS. 2A and 3A–3C, the reinforced sections are directly in line with the major load paths. The bottom of the channel is relatively light gauge (T7 about 0.040 to 0.050 inch) which is predominantly in sheer. In the center of the channel is a reinforced section RS (T6 is about 0.065 inch thick) to increase the denting resistance, for example, when the bike is high centered on a log and to reinforce the water bottle mounts in this area.

In FIGS. 5A and 5B, a composite channel structure is illustrated. In this structure, the channel is fabricated from layers of carbon fiber prepreg or other high-strength fibers in a resin matrix. In this arrangement, the channel shape is refined so that the edge ribs RR1' and RR2' are on the outside of the channels so that the mold or core will release easily. It is relatively easy to mold a composite part that does not have hollow cores and is therefore an attractive shape for composite suspension frame fabrication.

While preferred embodiments of the invention have been illustrated and described, it will be appreciated that other embodiments, modifications and adaptation of the invention will be readily apparent to those skilled in the art.

What is claimed is:

1. In a bicycle frameset having a front frame portion and a rear triangle swing arm portion, said front frame portion having a forward end and a trailing end, a head tube mounted on said forward end and a seat tube mounted on said trailing end, said rear triangle swing arm portion having a bottom bracket for receiving a crank assembly, said bottom bracket having a shaped external surface portion, a pair of dropouts for receiving a rear wheel assembly, a pair of chainstay members secured to said bottom bracket and extending in a rearward direction and secured to said dropouts, respectively, a pair of seatstay members having upper and lower ends, means securing said lower ends to said dropouts, respectively, and pivot means pivotally connecting said rear triangle swing arm portion to said front frame portion, the improvement comprising:

a rigid channel member having a pair of spaced channel legs joined by an integral base, said rigid channel member having upper and lower ends, said lower end having a shaped edge which is shaped complementary to the shape of the external surface of said bottom bracket, and means fixedly securing said lower end to said bottom bracket with said shaped edge in congruence with said shaped external surface portion, said pivot means pivotally securing said rear triangle swing arm portion to said front frame portion at the upper end of said rigid channel member.

2. The bicycle frameset defined in claim 1 wherein said rigid channel member is an extrusion of a light weight metal.

3. The bicycle frameset defined in claim 1 wherein said rigid channel member is made of a composite material.

4. The bicycle frameset defined in claim 2 wherein said rigid channel member has a base member having a central section which changes from a central thickness T1 to a thickness T2 at the sides thereof.

5. The bicycle frameset defined in claim 4 wherein said channel legs have a thickness T3, said thickness T3 being thicker than said thickness T2.

6. The bicycle frameset defined in claim 5 wherein at least one of said channel legs has a reinforcing rib surface and a reinforcing rib formed on said reinforcing rib surface.

7. The bicycle frameset defined in claim 4 wherein said legs are part of torque tubes, respectively.

8. In a bicycle frameset having a front frame portion and a rear triangle swing arm portion, said front frame portion having a forward end and a trailing end, a head tube mounted on said forward end and a seat tube mounted on said trailing end, said rear triangle swing arm portion having a bottom bracket for receiving a crank assembly, said bottom bracket having a shaped external surface portion, a pair of dropouts for receiving a rear wheel assembly, a pair of chainstay members secured to said bottom bracket and extending in a rearward direction and secured to said dropouts, respectively, a pair of seatstay members having upper and lower ends, means securing said lower ends to said dropouts, respectively, and pivot means pivotally connecting said rear triangle swing arm portion to said front frame portion, the improvement comprising:

a rigid extruded light-weight metal channel member having a pair of spaced channel legs joined by an integral base, said channel member having upper and lower ends, said lower end having a shaped edge which is shaped complementary to the shape of the external surface of said bottom bracket, and means fixedly securing said lower end to said bottom bracket with said shaped edge in congruence with said shaped external surface portion, said pivot means pivotally securing said rear triangle swing arm portion to said front frame portion at the upper end of said rigid channel member.

9. The bicycle frameset defined in claim 8 wherein said rigid extruded lightweight channel member has a base member having a central section which changes from a central thickness T1 to a thickness T2 at the sides thereof.

10. The bicycle frameset defined in claim 9 wherein said channel legs have a thickness T3, said thickness T3 being thicker than said thickness T2.

11. The bicycle frameset defined in claim 10 wherein at least one of said channel legs has a reinforcing rib surface and a reinforcing rib formed on said reinforcing rib surface.

* * * * *